United States Patent [19]

Hendrickx

[11] Patent Number: 4,466,472

[45] Date of Patent: Aug. 21, 1984

[54] WEB OR SHEET FASTENED TO AN ARTICLE

[75] Inventor: Johannes W. J. Hendrickx, Terborg, Netherlands

[73] Assignee: Vredestein N.W., Netherlands

[21] Appl. No.: 268,158

[22] Filed: May 29, 1981

[30] Foreign Application Priority Data

Jun. 5, 1980 [NL] Netherlands ........................ 8003295

[51] Int. Cl.[3] ............................................ B60C 5/02

[52] U.S. Cl. .................................... 152/349; 29/453; 29/463; 29/511; 138/30; 152/429; 220/3

[58] Field of Search ........................ 29/453, 463, 511; 138/30; 152/349, 429; 220/3

[56] References Cited

U.S. PATENT DOCUMENTS

| | | | |
|---|---|---|---|
| 1,114,937 | 10/1914 | Tessner | 152/429 X |
| 1,120,088 | 12/1914 | Saam | 152/429 X |
| 1,126,568 | 1/1915 | Reasoner | 152/429 X |
| 1,405,436 | 2/1922 | Pulverman | 152/429 X |
| 1,471,323 | 10/1923 | Badowski | 152/429 |
| 1,499,327 | 7/1924 | Badowski | 152/429 X |
| 1,864,001 | 6/1932 | Spicer | 152/429 |
| 1,969,118 | 8/1934 | Brucker | 152/429 |
| 2,949,071 | 8/1960 | Marchant | 29/453 X |
| 3,170,602 | 2/1965 | Suellentrop, Jr. et al. | 29/453 UX |
| 3,273,234 | 9/1966 | Henchert | 29/453 |
| 4,364,427 | 12/1982 | Lefrancois | 152/349 |

FOREIGN PATENT DOCUMENTS

| | | |
|---|---|---|
| 10943 | 5/1980 | European Pat. Off. . |
| 2452748 | 5/1976 | Fed. Rep. of Germany . |
| 517428 | 5/1921 | France . |
| 686494 | 7/1930 | France . |
| 739815 | 1/1933 | France . |
| 2385548 | 10/1978 | France . |
| 2406531 | 5/1979 | France . |
| 7,403,142 | 9/1974 | Netherlands . |

*Primary Examiner*—Charlie T. Moon
*Attorney, Agent, or Firm*—McGlew and Tuttle

[57] ABSTRACT

If articles are to be fastened to a web of elastomeric material and one does not want to apply the disadvantageous ways of providing holes in the web, or clamping a thickened portion of the web, or glueing, or vulcanizing, then very good results can be obtained by placing the web on a flange of an article which is provided with one or more inwardly tapered recesses, whereupon one places a counter-member on the web, which counter member has a complementary appearance with regard to the flange. The invention is particularly usefull when applied to expansion tanks and tire valves.

4 Claims, 5 Drawing Figures

2

9 8

10 7

7'

18 10 21

20

19 22

17

1
2
3
4
5
6
7
7'
8
9
10

WEB OR SHEET FASTENED TO AN ARTICLE

FIELD AND BACKGROUND OF THE INVENTION

A method for fastening a web or sheet to an article.

The invention relates to a method for fastening a web or sheet of elastomeric material to an article.

Mostly when putting such a method into practice a plurality of holes are made in the web or sheet of elastomeric material, which holes correspond to holes in the article to which the web is to be fastened. Screwed connections are then applied in these holes. This leads to too much deformation and tearing of the web already in case of small loads. That is why one will often turn to the application of clamping, by means of which the load is distributed somewhat more proportionally and with less chance of tearing. When still working with screwed connections it can hardly be avoided that one screwed connection is tighter than another and such a non-uniform load immediately affects the web of elastomeric material adversely. For under tensile strain the sheet can be pulled out further at one screwed connection than at another and this again means a shorter lifetime of the web.

Furthermore, articles are often to be fastened to a web of elastomeric material in an airtight way, for instance a membrane to an expansion tank or a valve base to a vehicle inner tube. The additional requirement of the airtightness, combined with higher loads, leads to the use of a clamp connection, where the web is provided with a bead or with a reinforcement. A drawback of these latter embodiments is that the web has become a moulded article, which has to be produced in special moulds.

A principally different way of fastening, where no use is made of clamping can be obtained by means of glueing or vulcanization. But these connections are not detachable, so that the web cannot be replaced either.

SUMMARY OF THE INVENTION

The invention aims at improving the above. According to the invention this has been achieved, in that the web is placed on a flange of the article provided with one or more recesses which are inwardly tapered, whereupon a counter-member is placed on the web which has a complementary appearance with regard to the flange and is fastened in a direction perpendicular to the web at a predetermined distance depending on the web thickness.

The invention will be illustrated hereinunder by means of the drawing, in which two embodiments are represented; in the first example the method according to the invention is shown for fastening a membrane, in particular in an expansion tank, and in the second example for fastening a cylindrical article, such as a valve stem to a vehicle inner tube. Although both examples relate to cylindrical articles, the invention is, of course, also applicable to oblong articles which are perpendicular to an edge of a web of elastomeric material, such as the bottom covering of a swimming pool and similar applications.

DESCRIPTION OF THE PREFERRED EMBODIMENTS

Figures 1, 2, 3:
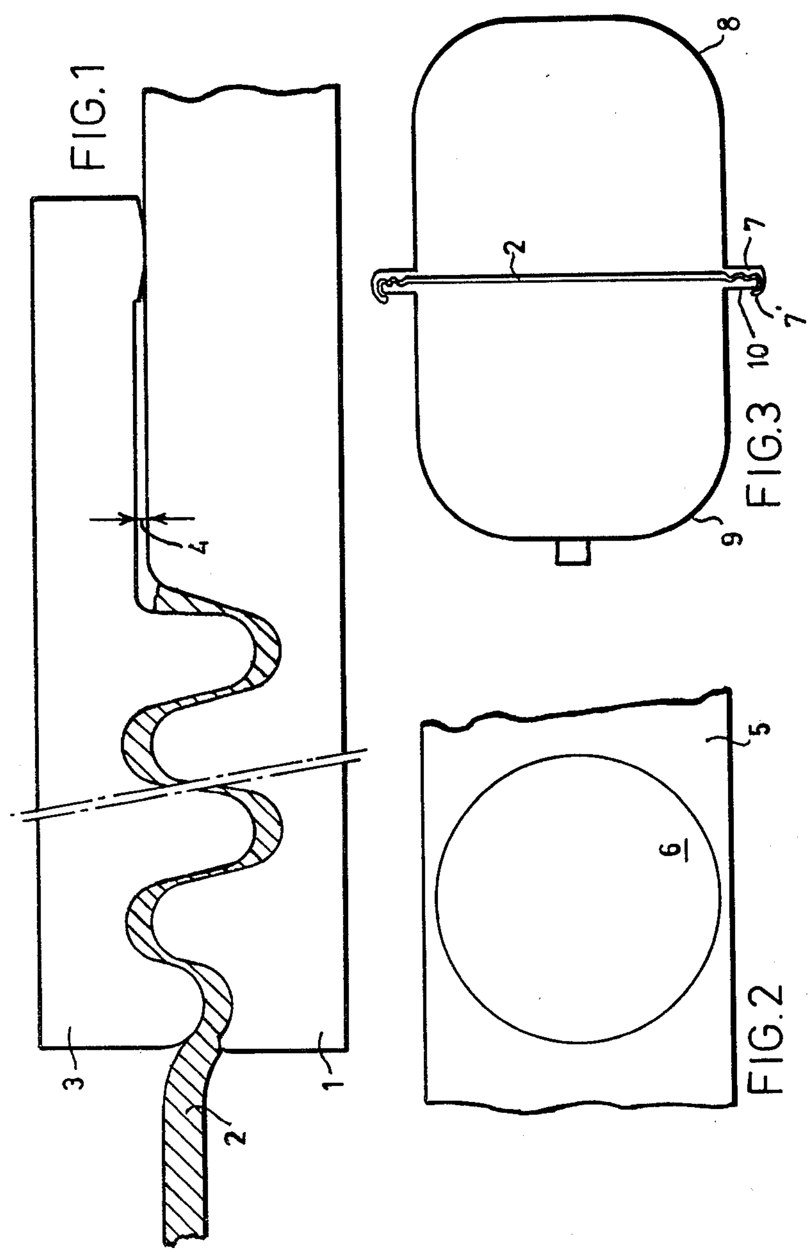
FIG. 1 shows the general principle of the invention.
FIGS. 2 and 3 show the mounting of a membrane in an expansion tank.

In FIG. 1 a homogeneous rubber web 2 and a pressure member 3 are disposed on a flange provided with inwardly tapered recesses. This pressure member has a complementary appearance with regard to the flange and is maintained with regard to the flange in a direction perpendicular to the web at a fixed distance 4, the distance 4 being dependent on the web thickness. Consequently, according to the invention a combination of encirclements and of alternate narrowings and widenings is obtained, so that with the compressible rubber a connection is obtained, which is considerably better than the connections known so far.

As a first example the fastening of an article around the elastomeric sheet, in this case the mounting of a membrane in an expansion tank is described with the aid of FIGS. 2 and 3. In the invention use can be made of commercial webs or sheets of rubber. From such a sheet 5 (FIG. 2) a disc 6 is cut. This disc is put into a flange 7 having an upstanding edge 7′ (FIG. 3) of the tank half 8, whereupon the tank half 9 with the flange 10 is pressed against the membrane. Subsequently, the tank halfs 8 and 9 are vigorously pressed against each other. Hereupon, as usual with this article, the edge 7′ can be turned around. Hereupon the force with which the tank halfs 8 and 9 are pressed against each other can be removed and the product is finished.

Figure 4:
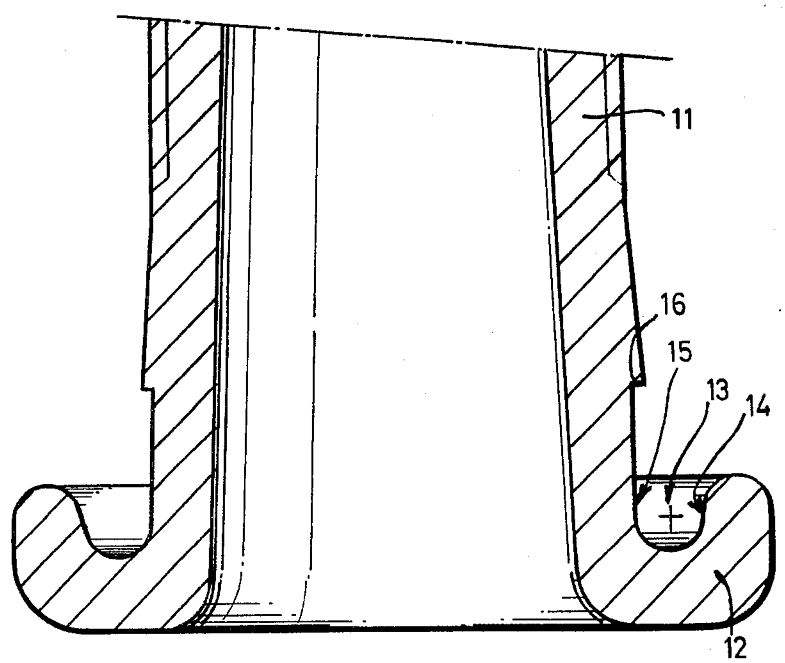
FIGS. 4 and 5 show axial cross-sections of a valve stem and a pressure member.
Figure 5:
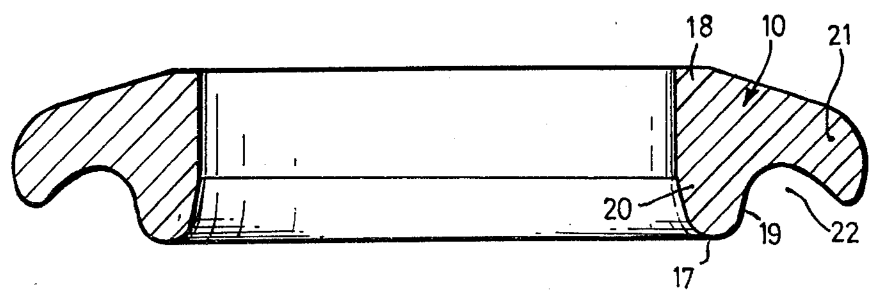

Another example is a cylindrical article, such as a tubular valve stem 11, which is to be fastened to a vehicle inner tube, after a hole of the correct diameter has been made in the tube (FIGS. 4 and 5). A valve stem 11 is inserted into the inner tube in which a hole has been made in one of the wall halfs. Hereupon a tubular pressure ring 10 is slid over the valve stem until the upper surface of the pressure ring passes a locking cam 16 at the stem.

In FIG. 4 on a scale larger than the real one only the lower portion of the valve stem 11 is shown, because the more upwardly positioned inner parts thereof which control the admission and discharge of air to and from the tube, are not relevant for the invention. The valve stem 11 is meant to cooperate with the pressure member 10 represented in FIG. 5. The valve stem has at its lower portion a radial flange 12 with an axial recess 13, it being remarkable that the cross-section of this recess is circular, but does not extend entirely over 180°. The recess wall 14 having the largest diameter is tapered conically and so contains in cross-section a straight line portion which in the drawing extends slantingly upwardly. The recess wall 15 having the smaller diameter, however, extends vertically upwardly up to the locking cam 16 which may run around the stem and which serves for locking the pressure member to be discussed at the hand of FIG. 5.

The pressure member 10 consists of a sleeve or axially protruding surface with specially shaped cross-sections on either sides 17 and 18. End 17 of the pressure member is adapted and largely complementary to the geometry of recess 13 of the valve stem. Opposite the tapered recess wall 14 of the flange 12 is a tapered conically outer wall 19 of the pressure member, but its inner wall also has a tapered conically flattening 20 and this is not the case with the recess wall 15 of the valve stem. It is exactly this design of the member 11 and the counter-member 10 which is responsible for the secure fixing of the sheet. The space which is bounded by the recess wall 15 and the inner wall 20 not being parallel to each other may contain a less-compressed portion of the web and this constitutes there as it were a widening, which is very hard to pull through between the furthermore substantially parallel boundary lines of the end portion 17 and the recess 13. It is remarked in this connection that something like this is also visible in the portion of the web 2 in FIG. 1 which is positioned most to the right.

The end 18 of the pressure member 10 is provided with a cover-like widening 21 with at the lower side a recess 22 which fits over the flange 12 of the valve stem, on the understanding that the outer portion of the radius of the recess 22 is about 50% larger than that of the just-meant outer portion. The radially outer edges of flange 12 and widening 21 are also curved and not sharp.

So after fixing, the web contains an S-shaped appearance and also this adds to a good fixing.

The inner diameter of the sleeve-like pressure member 10 and the outer diameter of the recess wall 15 of the valve base are to be almost the same and at least the pressure member has to be of sufficient resilient material for passing the locking cam 16.

The invention can very effectively be put into practice, if one works with articles and pressure members which have already been combined to pairs during the production, the pressure member being connected to a relatively high positioned portion of the articles by means of a temporary joint. When applying plastic this can easily be realized.

Though the invention is illustrated with the aid of substantially cylindrical articles and counter-members, it can also be applied to articles and counter-members having rectangular or square or other cross-sections. In case of a square or rectangular cross-section it is furthermore possible that the counter-member connects the article to only one side of the elastomeric sheet.

I claim:

1. A sealing structure comprising:

a first tubular member (11) having a radially outwardly extending flange (12) with at least one axially extending recess (13) defined thereon having a substantially semi-circular cross section of a first diameter, said recess having one wall (14) with a curvature of a diameter greater than said first diameter with a tapered conical surface portion tapered outwardly from said recess, said recess also having an opposite substantially axial wall (15), said recess (13) and walls (14,15) curved smoothly with each other;

a second tubular member (10) having an axially protruding surface (17,19,20) which is curved smoothly, said second member position to engage said first member with said axially protruding surface of said second member facing said flange recess (13), said axially protruding surface having a tapered conical area (19) juxtaposed with said one wall (14) of said recess and a tapered area (20) juxtaposed with said opposite wall (15) of said recess to define a varying space between said flange recess and said axially protruding surface, said varying space at least partially extending from said one wall toward said opposite wall;

said flange (12) and said axially protruding surface both being curved at outer ends thereof which face each other to form an outer part of said varying space;

an elastomeric web (2) having a uniform thickness which is greater than at least portions of the varying space so that the web is squeezed by varying amounts between the first member flange and the second member surface; and fastening means (16,18) acting between said first member flange and said second member surface to hold them together in a direction perpendicular to a major extension of said web.

2. A sealing structure according to claim 1, wherein said first member comprises a valve stem, said web comprising a vehicle tire inner tube having an opening therethrough for receiving said valve stem, said second member comprising a counter member with an opening therethrough for receiving said valve stem and holding a portion of said vehicle tire inner tube against said flange, said fastening means comprising a locking cam (16) formed on an outer surface of said valve stem forming a step facing said flange, said counter member having a diameter smaller than said locking cam adjacent said step so that said step engaged over said counter member with said counter member engaged to said valve stem.

3. A sealing structure according to claim 1, wherein said second member includes a cover like widening (21) at said outer end of said axially protruding surface, defining a curved recess for receiving said curved outer end of said flange and for extending radially outwardly of said curved outer end of said flange, said elastomeric web (2) extending between said widening and said outer end of said flange, said varying space extending between said outer ends and widening with respect to a portion of said varying space between said one wall (14) of said flange and said flattened area (19) of said second member.

4. A sealing structure according to claim 2, wherein said second member includes a cover like widening (21) at said outer end of said axially protruding surface, defining a curved recess for receiving said curved outer end of said flange and for extending radially outwardly of said curved outer end of said flange, said elastomeric web (2) extending between said widening and said outer end of said flange, said varying space extending between said outer ends and widening with respect to a portion of said varying space between said one wall (14) of said flange and said flattened area (19) of said second member.

* * * * *